United States Patent
Coppage et al.

(10) Patent No.: US 7,149,293 B1
(45) Date of Patent: *Dec. 12, 2006

(54) SYSTEM AND METHOD FOR CONTROLLING DATA SESSIONS IN A WIRELESS NETWORK

(75) Inventors: Carl Milton Coppage, Harrisonville, MO (US); Manish Mangal, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 920 days.

This patent is subject to a terminal disclaimer.

(21) Appl. No.: 10/161,303

(22) Filed: Jun. 3, 2002

Related U.S. Application Data

(63) Continuation-in-part of application No. 10/090,216, filed on Mar. 4, 2002, now Pat. No. 6,741,687.

(51) Int. Cl.
*H04M 15/00* (2006.01)
*H04M 11/00* (2006.01)

(52) U.S. Cl. .............. 379/114.2; 379/114.01; 379/114.15; 379/114.17; 455/406

(58) Field of Classification Search .......... 379/114.01, 379/114.15, 114.16, 114.17, 114.2, 132, 144.01; 455/405, 406, 408, 410, 411; 370/352
See application file for complete search history.

(56) References Cited

U.S. PATENT DOCUMENTS

| | | | |
|---|---|---|---|
| 5,825,857 A * | 10/1998 | Reto et al. ............. | 379/114.15 |
| 5,828,470 A | 10/1998 | Khuc et al. | |
| 5,966,654 A | 10/1999 | Croughwell et al. | |
| 6,097,804 A | 8/2000 | Gilbert et al. | |
| 6,101,378 A | 8/2000 | Barabash et al. | |
| 6,137,869 A | 10/2000 | Voit et al. | |
| 6,393,289 B1 | 5/2002 | Bunting et al. | |
| 6,404,870 B1 * | 6/2002 | Kia et al. ............. | 379/144.01 |
| 6,741,687 B1 * | 5/2004 | Coppage ................. | 379/114.2 |
| 6,961,412 B1 * | 11/2005 | Ruckart et al. .......... | 379/114.2 |
| 2002/0133457 A1 * | 9/2002 | Gerlach et al. ............. | 705/39 |

OTHER PUBLICATIONS

U.S. Appl. No. 10/090,216, filed Mar. 4, 2002 entitled "System and Method for Providing Prepaid Communications".
Office Action from U.S. Appl. No. 10/090,216, dated Jul. 11, 2003.
Office Action from U.S. Appl. No. 10/090,216, dated Feb. 3, 2003.
Office Action from U.S. Appl. No. 10/090,216, dated Sep. 24, 2002.
Office Action from U.S. Appl. No. 10/090,216, dated Jun. 20, 2002.
Advisory Action from U.S. Appl. No. 10/090,216, dated Dec. 24, 2002.

* cited by examiner

*Primary Examiner*—Quoc Tran

(57) ABSTRACT

A system and method for controlling data session in a wireless network are described. One exemplary method includes detecting a request to establish a data session between a first client device and another device, determining whether the first client device is authorized to establish the data session and, if so, establishing the data session and a control communication. The method further includes using the control communication session to control the data session.

18 Claims, 7 Drawing Sheets

SYSTEM AND METHOD FOR CONTROLLING DATA SESSIONS IN A WIRELESS NETWORK

CROSS REFERENCE TO RELATED APPLICATIONS

The present application is related to co-pending and commonly assigned U.S. patent application Ser. No. 10/090,216, for "System and Method for Providing Prepaid Communications," filed on Mar. 4, 2002, herein fully incorporated by reference for all purposes.

BACKGROUND

1. Field of the Invention

The present invention relates to telecommunications systems and, more particularly, to a method and system for controlling data sessions in a wireless network and providing prepaid data services.

2. Description of Related Art

For many years, the telecommunications industry has recognized the need to provide a mechanism for restricting or otherwise managing use of communication services based on a measure of subscriber account balance. In systems providing account balance services, a subscriber may first establish a prepaid account with a service provider and then pay for duration of communication services on the communication network by adding money to the prepaid account. An account balance typically represents a measure, such as time or monetary value, of communication services that a subscriber is authorized to use. As the subscriber uses the service, the carrier may then continuously monitor and decrement the balance of the prepaid account. When the balance drops to a low threshold level, the service provider may notify the subscriber and allow the subscriber to add more money to the account. Further, once the account is exhausted, i.e., the balance drops to zero, the service provider may refuse to provide additional services to the subscriber or charge the subscriber for an excess use. Other arrangements are also possible.

Offered for years in both landline and wireless systems, prepaid service has been viewed as a tool to attract "credit challenged" consumers, that is, potential customers with poor credit histories or who otherwise lack adequate credit references. In addition, prepaid services appeal to consumers who do not want to be burdened with contracts and bills, who want to maintain fixed budgets, or who simply wish to remain anonymous. For example, travelers who require a temporary phone service can benefit from prepaid services in the form of a rented wireless phone that has been activated with prepaid minutes. Similarly, a pre-activated wireless phone with initial prepaid minutes can be given, sold or rented through various channels, including supermarkets and convenience stores.

The concept of account balance services, however, encompasses more than just traditional prepaid communications. In general, an account balance service can involve establishing or applying any type of account balance that serves as an actual or suggested limit on use of communications services. The account balance could represent a time limit such as minutes of use, or a monetary limit such as dollars of use, for example. Further, the account balance that defines the actual or suggested limit on use need not necessarily come from a prepayment by a subscriber or other party. Rather, the account balance could simply represent an assigned limit on use, which the subscriber may or may not be allowed to exceed.

In addition to establishing voice calls over traditional voice connections, many existing mobile stations can also engage in packet-data communications. While, there are existing solutions for controlling calls over traditional voice connections, a need still exists for a system and method for controlling data sessions in a wireless network.

SUMMARY

The present invention relates to a method and system for controlling data sessions in a wireless network.

One exemplary method for controlling data communication in a wireless network includes establishing a control communication session via a data network between a first client device and a control network entity, establishing a data communication session via the data network between the first client device and another device, and using the control communication session to control the data communication session. In one embodiment, the client device and the control network entity may interact with an intermediate device, such as a packet data serving node, that can take control actions based on a signal provided from the control network entity.

One exemplary system for controlling data sessions in a communications network includes a client device arranged to establish data communication sessions, a control network entity arranged to control data communication sessions, and an access gateway arranged to detect a request to establish a data communication session between the client device and another device. According to an exemplary embodiment, the access gateway may then communicate with the control network entity to determine if a prepaid balance of the subscriber is sufficient to establish the requested data communication session. If the prepaid balance is sufficient, the access gateway is arranged to establish a control communication session between the client device and the control network entity, and further to establish the data communication session between the client device and another device.

These as well as other aspects and advantages will become apparent to those of ordinary skill in the art by reading the following detailed description, with appropriate reference to the accompanying drawings.

BRIEF DESCRIPTION OF THE DRAWINGS

Exemplary embodiments of the present invention is described herein with reference to the drawings, in which.

DETAILED DESCRIPTION OF EXEMPLARY EMBODIMENTS

Figure 1:
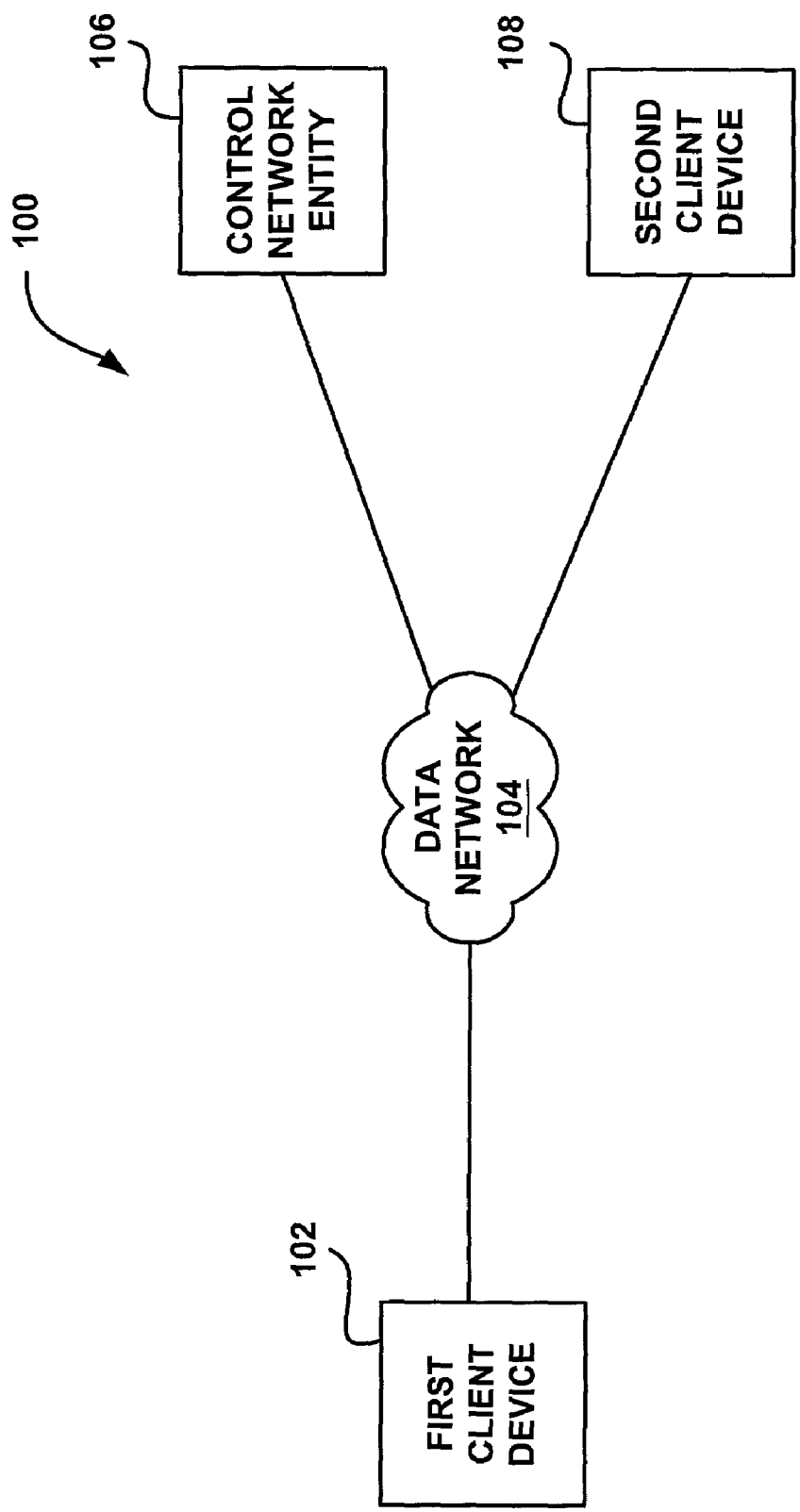
FIG. 1 is a block diagram illustrating a telecommunications network for controlling data sessions according to the exemplary embodiments.

FIG. 1 is a block diagram of a telecommunications network 100 in which exemplary embodiments for controlling data communication sessions can be employed. It should be understood that this and other arrangements and processes described herein are set forth for purposes of example only, and other arrangements and elements (e.g., machines, interfaces, functions, orders of elements, etc.) can be used instead and some elements may be omitted altogether. Further, as in most telecommunications applications, those skilled in the art will appreciate that many of the elements described herein are functional entities that may be implemented as discrete components or in conjunction with other components, in any suitable combination or location.

As shown in FIG. 1, network 100 includes a first client device 102, a second client device 108, a control network entity 106, and a data network 104. First client device 102 and/or second client device 108 may take any suitable form, such as, for instance, a cellular or PCS telephone, a computer, a fax machine, or a personal digital assistant ("PDA"). According to an exemplary embodiment, first client device 202 and/or second client device 108 may be third generation ("3G") mobile station capable of simultaneously engaging in voice and data sessions. However, it should be understood that first client device 102 and second client device 108 are not limited to wireless devices. For example, second client device 108 could also be a network server such as an e-mail server or any other type of server.

First client device 102 communicates with both control network entity 106 and second client device 108 via data network 104. First client device 102 may establish a separate data communication session with each entity illustrated in FIG. 1. It should be understood that data network 104 may include a carrier data network comprising a packet-data network such as an intranet, a local area network ("LAN") or a wireless network, for instance.

According to an exemplary embodiment, first client device 102 may interact with control network entity 106 via one control communication session established via data network 104 to control the establishment of one or more data communication sessions between first client device 102 and another device such as second client device 108, for instance. Control network entity 106 may then use the control communication session established between first client device 102 and control network entity 106 via data network 104 to control one or more data communication sessions established to or from first client device 102 and other entities or client devices in the network.

Further, as will be described in greater detail below, control network entity 106 may control data sessions between first client device 102 and second client device 108 using an intermediate entity, such as a packet data serving node, or another access gateway. In such an embodiment, the intermediate entity can take control actions based on control signals being provided from control network entity 106.

For example, if a user at first client device 102 is a prepaid subscriber having a prepaid balance, control network entity 106 may determine if the user has a sufficient balance to establish a data communication session to another device before first client device 102 establishes any new data communication sessions. Then, during the progress of one or more data communication sessions established to/from first client device 102, control network entity 106 may monitor the prepaid balance of the user at first client device 102. For example, if the prepaid balance of the user at first client device 102 reaches a low threshold level, control network entity 106 may use the control communication session established with first client device 102 to instruct first client device 102 or another network entity, such as an intermediate entity (a packet data serving node, for instance) to disconnect one or more concurrent data communication sessions to/from first client device 102, the embodiments of which will be described in greater detail below.

Figure 2:
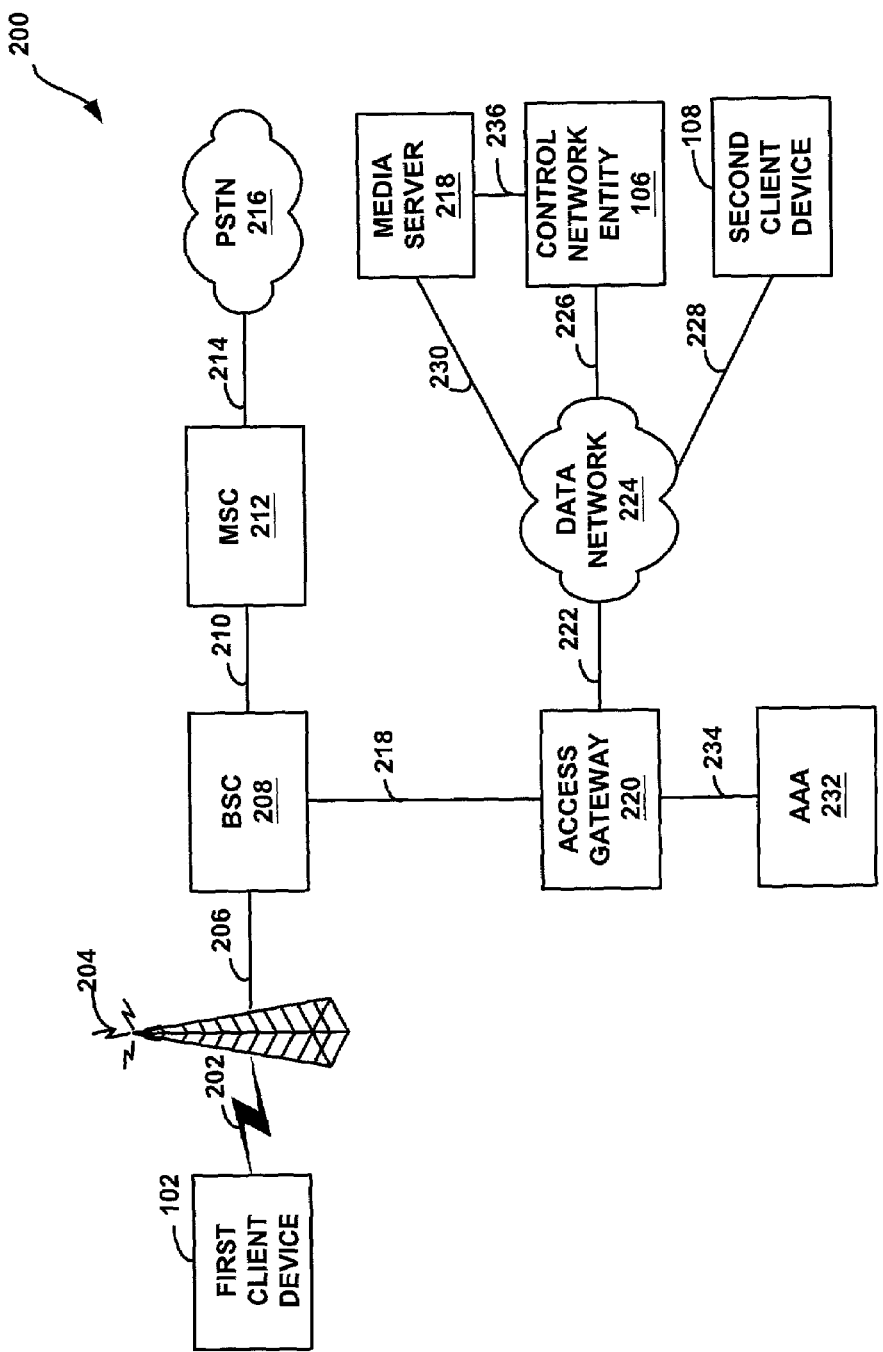
FIG. 2 is another block diagram illustrating a telecommunications network for controlling data sessions according to the exemplary embodiments.

FIG. 2 is a detailed block diagram of a telecommunications network 200 in which exemplary embodiments for controlling data communication sessions can be employed.

As illustrated in FIG. 2, first client device 102 is coupled to a base station controller ("BSC") 208 via an intermediate base transceiver station ("BTS") 204 and links 202 and 206. BSC 208 is in turn coupled to a mobile switching center ("MSC") 212 via a communication link 210. MSC 212 is then connected by a voice data link 214 to the public switched telephone network ("PSTN") 216, which provides a path through which MSC 212 may connect voice calls (or voice-band calls) between first client device 102 and remote client devices.

As shown in FIG. 2, network 200 also includes a data network subsystem, including an access gateway entity 220, an authorization, authentication and accounting ("AAA") server 232, a data network 224, a control network entity 106, a media server 234, and second client device 108. BSC 208 is interconnected to data network 224 via access gateway entity 220. As shown in FIG. 2, BSC 208 is interconnected to access gateway entity 220 via a communication link 218, and access gateway entity 220 is connected to data network 224 via a communication link 222. Further, data network 224 is interconnected to control network entity 106, second client device 108, and access gateway entity 220 via communication links 226, 228 and 230, respectively. Alternatively, control network entity 106 and media server 234 may be configured as nodes on data network 224. Data network 224 may be or include an IP network, such as the public Internet or a private intranet such as a wireless carrier's core IP network.

In one embodiment, communication links 218, 222, 226, 228, and 230 may be or include wire or fiber optic cable links, wireless communication links, or a combination thereof.

Control network entity 106 may be a network server arranged to provide prepaid data session services according to exemplary embodiments that will be described in greater detail below. Media server 234 communicates with control network entity 106 via a communication link 236. Alternatively, media server 234 may communicate with control network entity 106 via data network 224. The communication link 236 may include a wire or fiber optic cable link, a wireless communication link, or a combination thereof.

According to an exemplary embodiment, media server 234 could take any of a variety of forms. For example, media server 234 may be a streaming server. In such an embodiment, upon detecting a trigger from control network entity 214, e.g., a message including instructions to play an account balance announcement, media server 234 may play the account balance announcement or send video/graphical messages to a user at first client device 102. However, it should be understood that media server 234 is not limited to providing information related to account balance announcements, and it could also provide different types of information to users at client devices.

In one embodiment, media server 234 may set up a Real Time Transport Protocol ("RTP") session with one or more client devices involved in the data session, and use the RTP session to play account balance announcements or to send messages to subscribers at the client devices.

RTP is a real-time transport protocol that provides end-to-end delivery services to support applications transmitting real-time data, such as audio or video, over unicast or multicast network services. RTP services include payload type identification, sequence numbering, and time stamping, and data transmission is monitored by means of a closely integrated control protocol called Real Time Control Protocol ("RTCP") communications.

To set up an RTP session, an application may define a pair of destination transport addresses, such as a network address and a pair of ports for RTP and RTCP. For multimedia sessions, each medium may be carried in a separate RTP session having RTCP packets reporting reception quality for each session. For example, audio and video may be transmitted via different RTP sessions, enabling a recipient to select whether or not to receive a particular medium. It should be understood that different communication means between media server 234 and client devices could also be used.

According to an exemplary embodiment, access gateway 220 enables first client device 102 to communicate via data network 224. In one embodiment, access gateway 220 may be a packet data serving node ("PDSN") that may route packets through BSC 208 and data network 224. First client device 102 may thus communicate with entities on data network 224 via a communication path including air interface 202, BTS 204, BSC 208, and access gateway 220.

As illustrated in FIG. 2, access gateway 220 is coupled to AAA server 232 via a communication link 234. AAA server 232 may function to verify if client devices are authorized to communicate over data network 224. Further, according to an exemplary embodiment, AAA server 232 may include a subscriber profile that indicates whether subscribers are prepaid data subscribers. If AAA server 232 identifies a subscriber as a prepaid data subscriber, AAA server 232 may provide that information to access gateway 220 that may then communicate with control network entity 106 to determine if a sufficient balance of a subscriber at first client device 102 exists to establish a data communication link between first client device 102 and another client device.

Figure 3:
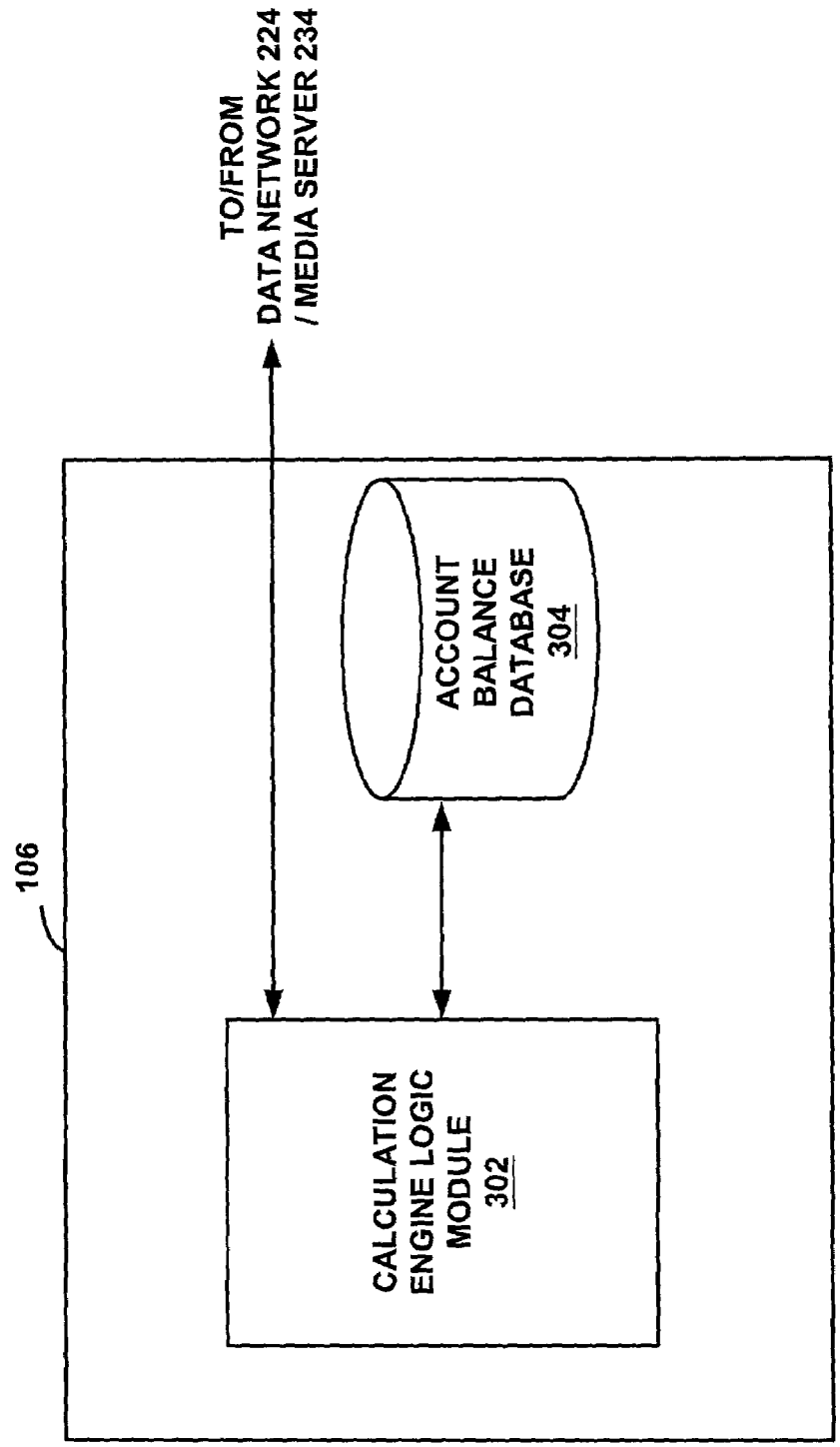
FIG. 3 is a block diagram of a control network entity that may be employed in the exemplary embodiments.

FIG. 3 is a block diagram illustrating exemplary control network entity 106 in greater detail. Exemplary embodiments of control network entity 106 in FIG. 3 will be described in reference to account balance services. However, it should be understood that control network entity 106 could perform various control functions, and control network entity 106 is not limited to controlling data communication sessions based on prepaid account balances.

According to an exemplary embodiment, control network entity 106 may track a balance of a prepaid (or pre-established, i.e., assigned) account established for a user at first client device 102. In such an embodiment, control network entity 106 includes a calculation engine logic module 302 and an account balance database 304. It should be understood that account balance database 304 and calculation engine logic module 302 may be located on different network entities. In such an embodiment, calculation engine logic module 302 may access account balance database 304 via data network 224, or alternatively, calculation engine logic module 302 may have a direct communication link to account balance database 304.

Account balance database 304 may include subscriber profiles, and each subscriber profile may identify a subscriber using an identifier of the subscriber's client device. For instance, a subscriber profile may be identified using a Network Access Identifier ("NAI") or an International Mobile Station Identifier ("IMSI"). However, different identifiers could also or instead be used. Each subscriber profile may further identify data service types that each respective subscriber is authorized to access. For instance, the subscriber profile may define that the subscriber is not authorized to send or receive media data.

Alternatively, each subscriber may be authorized to access any data communication service as long as the subscriber has a sufficient balance in a prepaid account. Then, calculation engine logic module 302 may decrement a prepaid account balance based on a number and size of packets that are communicated to/from first client device 102. Alternatively, the subscriber's balance may be decremented based on a data service type. For instance, different values may be decremented from the subscriber's balance when a subscriber is engaged in web browsing and on-line real-time chat. For example, the subscriber's balance may be decremented at a higher rate when the subscriber is engaged in on-line real-time chat than when the subscriber is engaged in web browsing. Further, alternatively, the subscriber's balance may be decremented based on a number of messages, such as SMS messages, being sent to or from client device. Those skilled in the art will appreciate that many different embodiments are possible as well.

According to an exemplary embodiment, first client device 102 may be involved in more than one data session. Control network entity 106 may control origination, termination and suspension of individual and concurrent data sessions that terminate at or originate from first client device 102. For example, individual sessions may be identified using session identifiers associated with a domain name, or resolved IP addresses as a result of a domain name system ("DNS") request associated with a domain name. According to an exemplary embodiment, a subscriber's profile may include an exception list defining free sessions for the subscriber, i.e., sessions for which the subscriber's balance should not be decremented. The free sessions may be identified using domain names, IP addresses of terminating entities, application type identifiers, or a combination thereof. For example, the free sessions may include communication sessions with the control network entity's carrier's web-based self management site. Control network entity 106 may use the exception list specified in the subscriber's profile to determine if the subscriber's balance should be decremented for a specific session. In such an embodiment, when the subscriber's balance reaches a predetermined low threshold level, control network entity 106 may terminate individual billable sessions, but still allow the non-billable sessions to remain connected.

Figure 4:
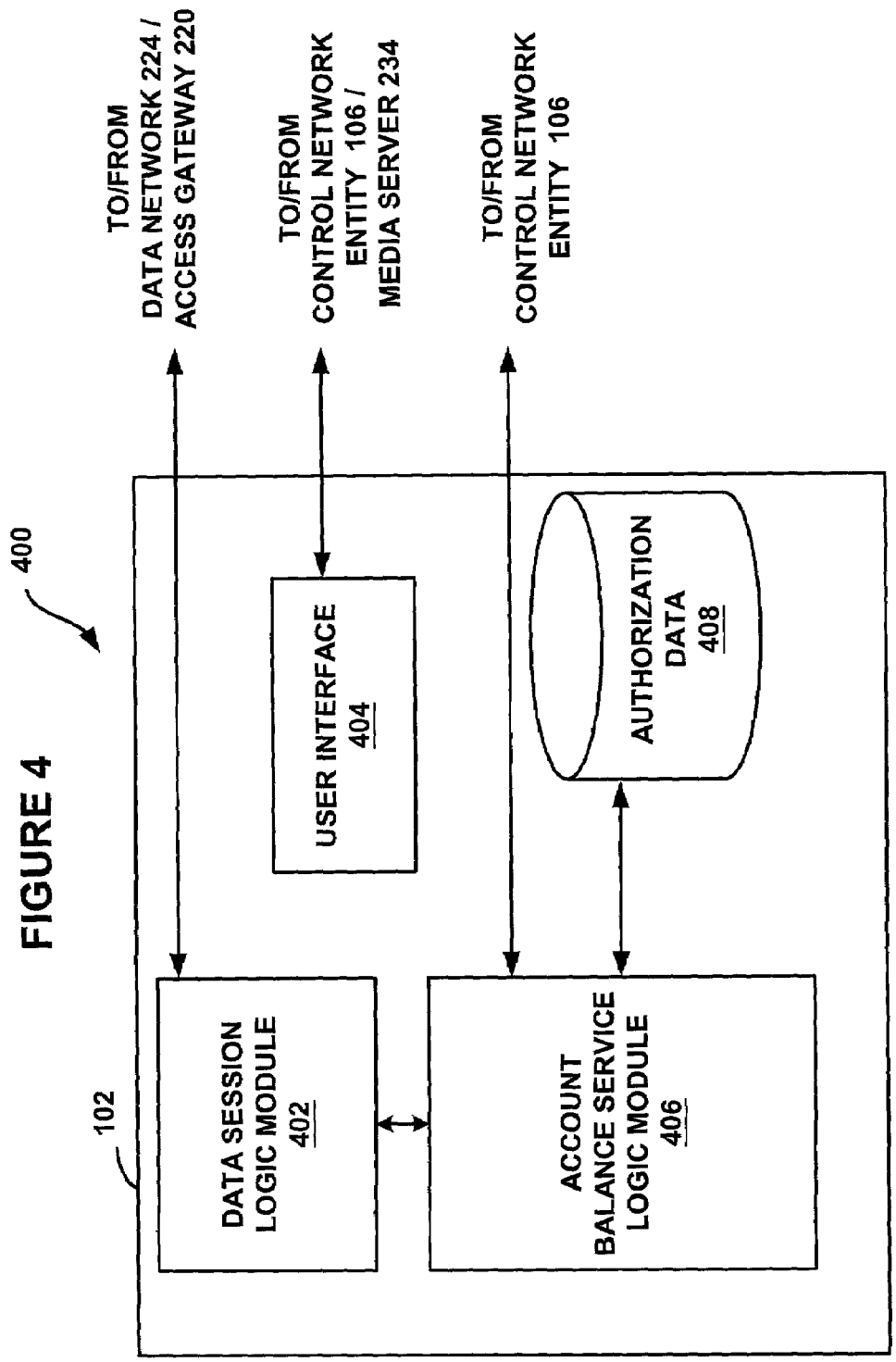
FIG. 4 is a block diagram of a client device that may be employed in the exemplary embodiments.

FIG. 4 is a block diagram illustrating exemplary first client device 102 in greater detail. As indicated above, first client device 102 may be a wireless telephone such as a 3G wireless telephone capable of simultaneously engaging in voice and data communication sessions. As shown in FIG. 4, first client device 102 includes a data session logic module 402, a user interface 404, an account balance service logic module 406, and an authorization database 408. It should be understood that first client device 102 also includes a processor (not shown) programmed to execute an appropriate set of instructions stored in a memory of first client device 102.

Authorization data storage 408 may store authorization and authentication information for first client device 102 and its subscriber. The authorization data may include a unique identifier assigned to first client device 102, such as a mobile identification number ("MIN"), for instance.

As illustrated in FIG. 4, account balance service logic module 406 interacts with data session module 402. In one exemplary embodiment, account balance service logic module 406 may receive a request to disconnect an existing data session. According to an exemplary embodiment, account balance service logic module 406 may receive from control network entity 106 a session disconnect request when control network entity 106 determines that the subscriber's balance has reached a zero threshold level. In such an embodiment, account balance service logic module 406 may notify data session logic module 402 to disconnect the data session. It should be understood that the described methods are not limited to a single data session being placed from/to first client device 102, and first client device 102 may be simultaneously engaged in more than one data session, in addition to the control session between first client device 102 and control network entity 106. In such an embodiment, control network entity 106 may control more than one data communication session being established to or from first client device 102. Control network entity 106 may use a NAI of first client device 102 to control multiples sessions being established to or from first client device 102, and the NAI can be used to bind the multiple sessions to the user's account.

Further, as illustrated in FIG. 4, first client device 102 includes user interface 404 that may be used to play or display information, such as announcements, being received from media server 234. Additionally, a subscriber at first client device 102 may input information via user interface 404, and the input information may be then communicated to control network entity 106.

In one embodiment, a user at first client device 102 may initiate an application, such as web browsing, for instance, that requires a data communication session to be established between first client device 102 and another entity. Alternatively, first client device 102 may be a terminating entity for a data communication session being established from another entity. In either embodiment, when data session logic module 402 detects a trigger to establish a data communication session to or from first client device 102, data session logic module 402 may begin establishing a data communication session with access gateway 220.

In one embodiment, data session logic module 402 can initiate data communication by sending an origination message over an air interface access channel available on air interface 202, and via BSC 208, to MSC 212 illustrated in FIG. 2. According to industry standards, the origination request message may include a "packet data" service option code that characterizes the requested communication as packet-data communication, as compared with a traditional voice communication. When MSC 212 receives the origination request, it may then detect the "packet data" service option code and responsively send the message back to the BSC 208 for handling.

In turn, when BSC 208 receives the origination request (or an "assignment request") from MSC 212, BSC 208 may establish a radio link layer connection with first client device 102, by assigning first client device 102 to operate on a particular traffic channel over air interface 202 (e.g., a fundamental traffic channel, and possibly one or more supplemental channels). In addition, BSC 208 then sets up a data-link layer connection with access gateway 220, and access gateway 220, upon authenticating the subscriber of first client device 102, establishes a data-link layer connection with first client device 102.

The interface between BSC 208 and access gateway 220 is referred to as the "R-P interface." In addition, the interface is also referred to as the A10/A11 interface, where an "A10" interface carries frames of data between the BSC and the PDSN with generic routing extension ("GRE") over IP, and where "A11" interface carries mobile-IP signaling messages between BSC 208 and access gateway 220 such as the PDSN.

In order to establish a data-link layer connection between BSC 208 and access gateway 220 such as a PDSN, for instance, a packet control function ("PCF") on BSC 208 may send an A11 Registration Request message to access gateway 220, providing access gateway 220 with a PCF session identifier that the PCF has assigned to the packet data session. Access gateway 220 may then record an association between first client device 102 (e.g., its IMSI) and the PCF session identifier (and the PCF address). Then, access gateway 220 may return an A11-Registration Reply message with an "accept" indication.

In addition, immediately after access gateway 220 opens an R-P session for first client device 102, access gateway 220 may send a Link Control Protocol ("LCP") Configure-Request message for a new PPP session to the mobile station. Alternatively, if first client device 102 has an established PPP session with access gateway 220, access gateway 220 does not send a Configure-Request.

During this process, first client device 102 may obtain an IP address, to facilitate packet communications. For instance, access gateway 220 such as a PDSN may assign an IP address to first client device 102. Alternatively, access gateway 220 may communicate with a mobile-IP home agent or other network entity to obtain an IP address for first client device 102.

Alternatively, first client device 102 may automatically enter into an "always-on" data session upon power up, so as to provide IP network connectivity similar to that available through today's broadband landline modems. In particular, first client device 102 may automatically send a "packet data" initiation request upon power up and to then negotiate with access gateway 220 to establish a PPP session.

Figure 5:
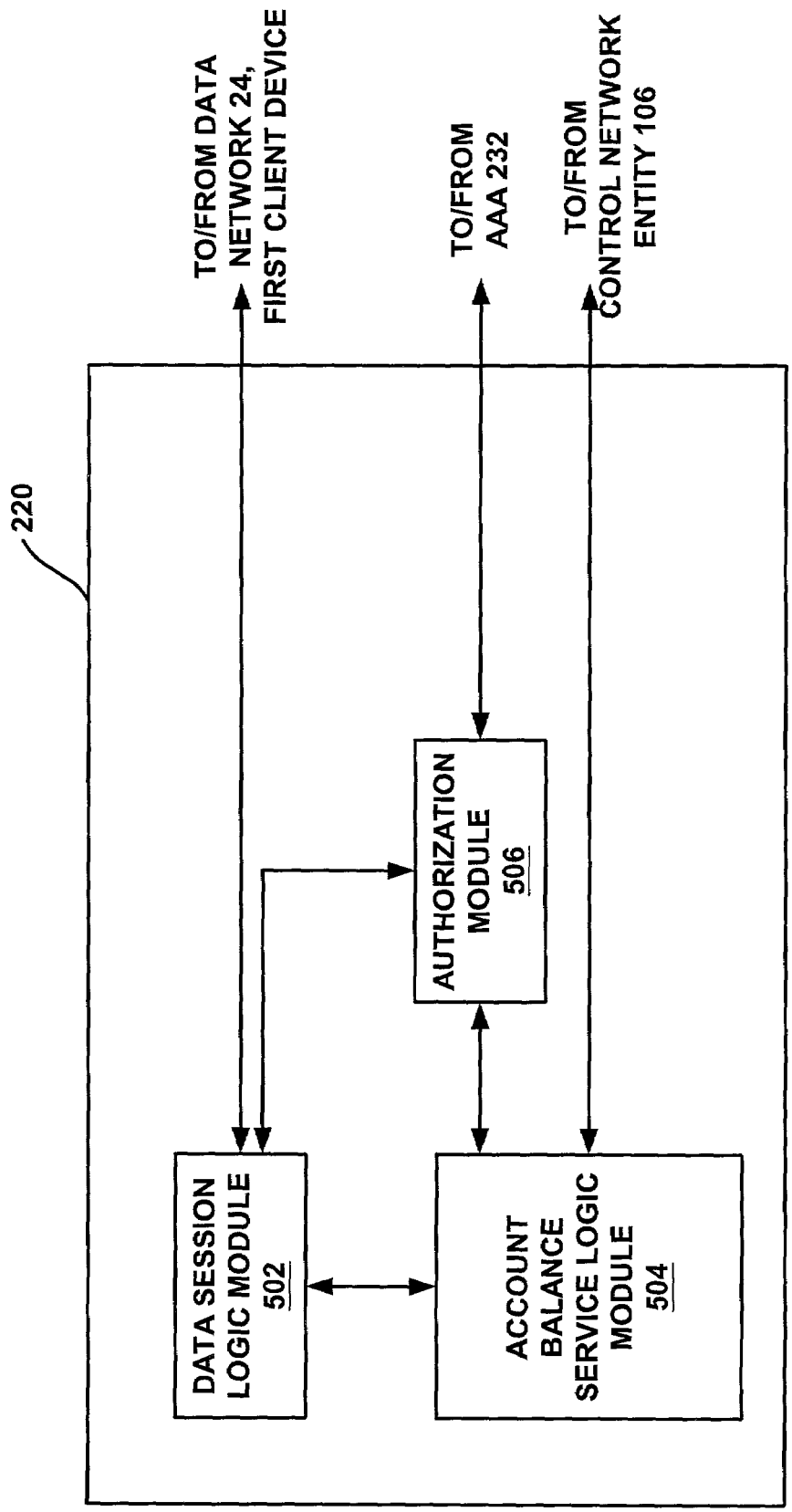
FIG. 5 is a block diagram of an access gateway that may be employed in the exemplary embodiments.

FIG. 5 is a block diagram illustrating exemplary access gateway 220 in greater detail. Access gateway 220 includes a data session module 502, an account balance service logic module 504, and an authorization module 506. It should be understood that access gateway 220 also includes a processor programmed to execute an appropriate set of instructions stored in a memory of access gateway 220.

According to an exemplary embodiment, when data session logic module 502 receives a data session request from first client device 102, data session logic module 502 triggers authorization module 506 to determine whether first client device 102 is authorized to receive data session services. To do that, authorization module 506 communicates with AAA server 232. For instance, authorization module 506 may send to AAA server 232 an authorization request including a request to authenticate a subscriber of first client device 102. According to an exemplary embodiment, a subscriber profile on AAA server 232 may identify the subscriber as a prepaid data subscriber. In such an embodiment, upon a successful authentication of the subscriber, AAA server 232 may send to authorization module 506 an authorization response including an identifier classifying the subscriber as a prepaid data subscriber.

When authorization module 506 receives the authorization response classifying the subscriber as a prepaid data subscriber, authorization module 506 may trigger account balance service logic module 504 to communicate with control network entity 106. For instance, account balance service logic module 504 may query control network entity 106 to determine if the subscriber of first client device 102 has a sufficient balance to establish the requested data session. In one embodiment, access gateway 220 may specify a type of data session being established at first client device 102, and control network entity 106 may determine if sufficient balance exists to establish such a data session. Further, control network entity 106 may provide to account balance service logic module 504 a balance measure available for first client device 102. For instance, the balance measure may take a form of a number of bytes or megabytes that may be communicated to/from first client device 102 until the funds reach a low threshold level.

When account balance service logic module 504 receives the balance information from control network entity 106 and the subscriber of first client device 102 has sufficient funds to establish the requested data session, account balance service logic module 504 triggers data session logic module 502 to establish the requested data session. Additionally, a control communication session is established between first client device 102 and control network entity 106 via access gateway 220.

Alternatively, if access gateway 220 determines that first client device 102 does not have a sufficient balance to establish the requested data session, access gateway 220 may communicate with first client device 102 and then may redirect first client device 102 to another network entity configured to provide balance services to subscribers. For instance, once redirected, the subscriber of first client device 102 may refill the balance.

In one embodiment, since access gateway 220 may monitor data flow to and from first client device 102, account balance service logic module 504 may provide to control network entity 106 real time updates including data flow information defining how much data has been communicated to and from first client device 102, and control network entity 106 may decrement the subscriber's balance based on the updates being received from access gateway 220. It should be understood that access gateway 220 may periodically send updates to control network entity 106. For instance, access gateway 220 may be configured with a timer that is restarted every time an update message is sent to control network entity 106. Alternatively, access gateway 220 may be configured to determine when to send the next update based on how much data is transmitted to and from client devices 102 or based on the available balance. For instance, if a subscriber's balance is low, access gateway 220 may send update messages more frequently than if the subscriber's balance is high. It should be understood that different embodiments are possible as well.

When the subscriber's balance reaches a low threshold level, control network entity 106 may send via the control communication session a request to disconnect one or more data sessions at first client device 102. Alternatively, instead of sending the message to first client device 102, control network entity 106 may send the disconnection request to access gateway 220, and access gateway may responsively disconnect one or more data sessions at first client device 102. Alternatively, the disconnection request may be relayed to first client device 102, and first client device 102, responsively to receiving the request, may disconnect one or more data sessions.

Further, alternatively, account balance service logic module 504 at access gateway 220 may be configured to monitor account balance usage during the progress of data sessions at first client device 102. In such an embodiment, account balance service logic module 504 may be configured with decrement rates, and the decrement rates may be based on a size of data packets being transmitted to/from client devices, types of data packets being transmitted, or other factors. Once a data session is disconnected, account balance service logic module 504 may send via the control communication session to control network entity 106 an update indicating a new account balance.

Figure 6A:
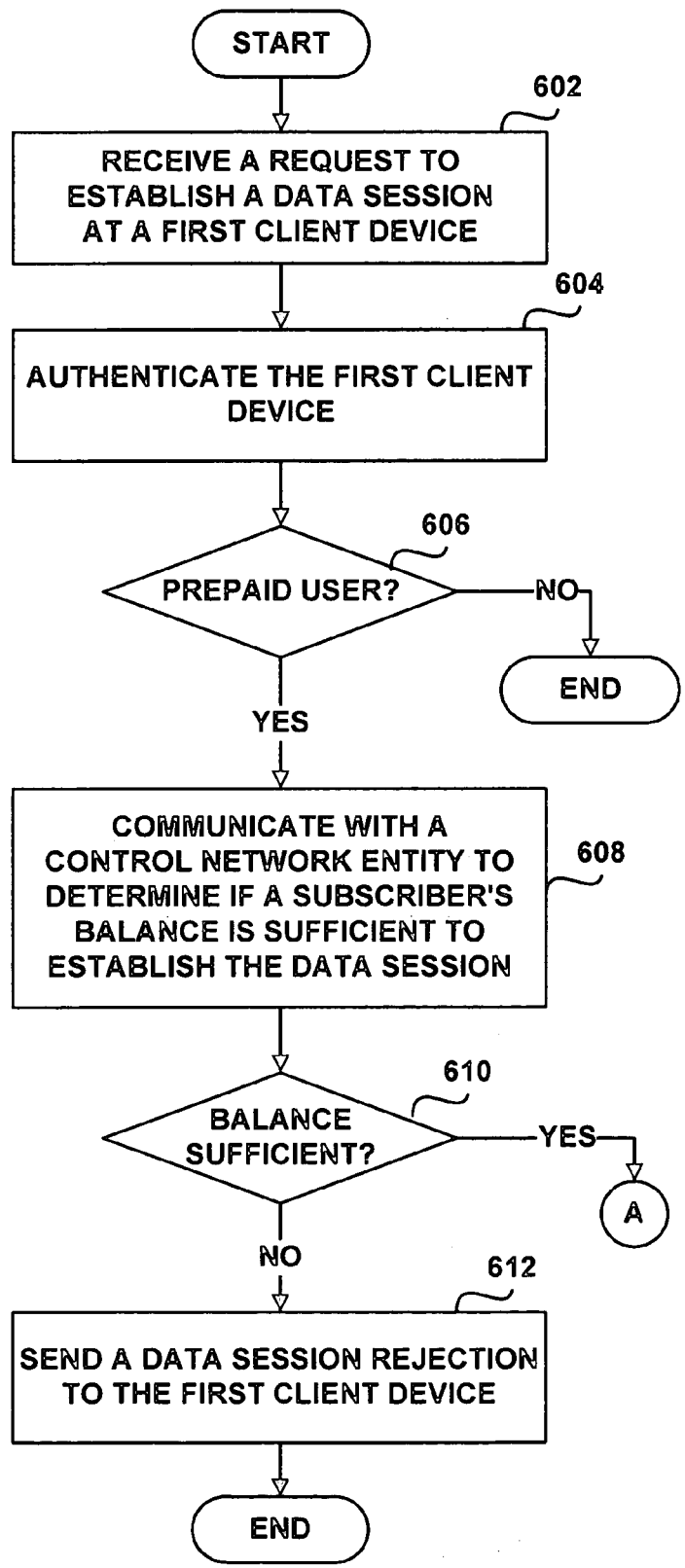
FIGS. 6A and 6B are a flow chart illustrating a method for controlling data communication sessions for a client device.
Figure 6B:
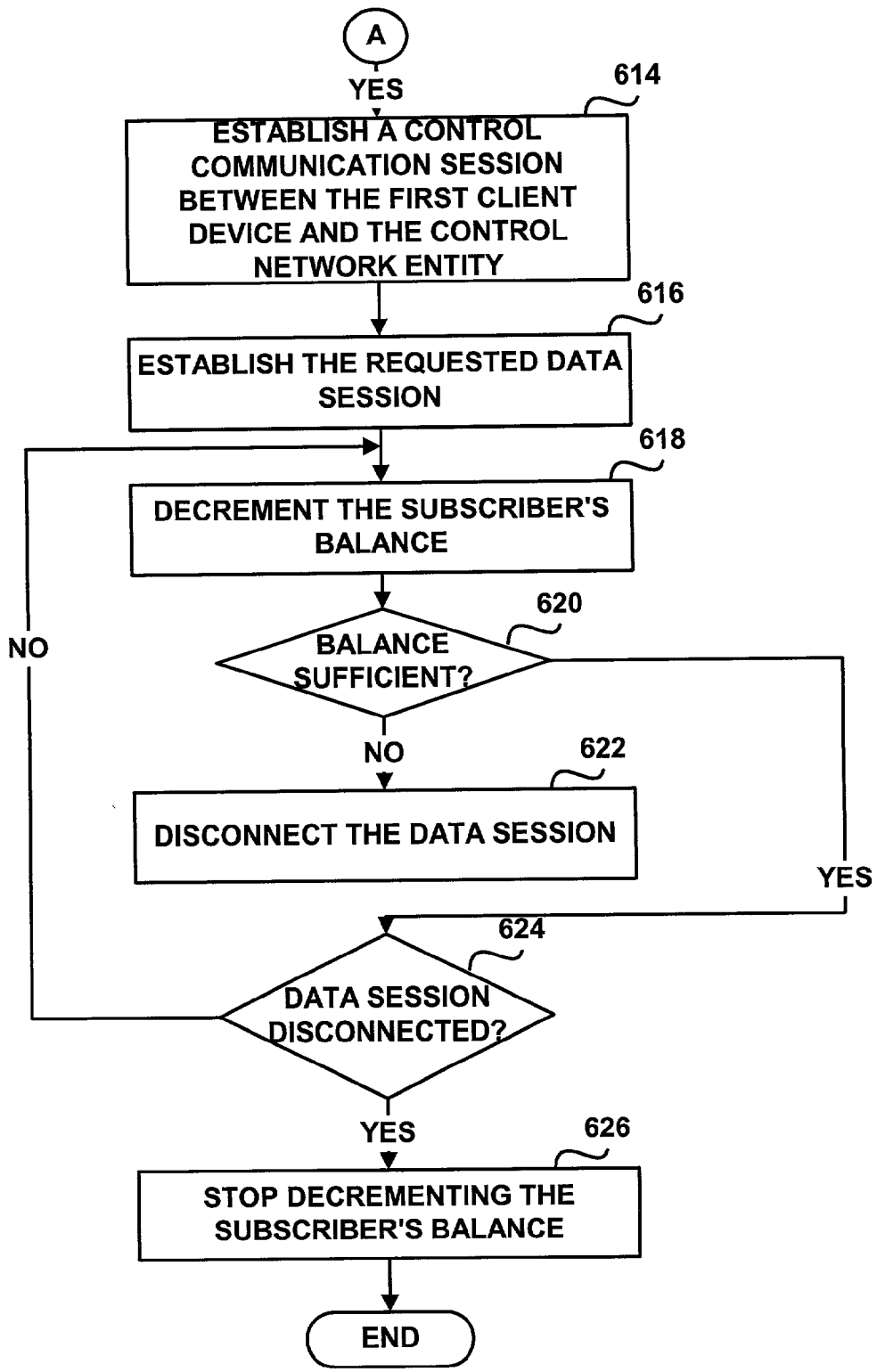

FIGS. 6A and 6B are a flow chart illustrating a method 600 for providing prepaid data services to a client device. Method 600 will be described in reference to devices illustrated in FIG. 2; however, it should be understood that method 600 is not limited to those devices, and method 600 could also be executed at different devices as well.

At step 602, access gateway 220 receives from first client device 102 a request to establish a data session. It should be understood that first client device 102 may initiate establishing the data session to a second device in network 200. When access gateway 220 receives the request, at step 604, access gateway 220 authenticates a subscriber of first client device 102. For instance, access gateway 220 may communicate with AAA server 232 to authenticate the subscriber. In such an embodiment, access gateway 220 may send to AAA server 232 an authentication request including NAI of first client device 102 and a password provided by the subscriber. When AAA server 232 receives the request, AAA server 232 authenticates the subscriber using a subscriber's profile. According to an exemplary embodiment, the subscriber's profile may classify the subscriber as a prepaid subscriber. In such an embodiment, when AAA server 232 successfully authenticates the subscriber, AAA server 232 may send an authentication response defining a successful authentication, and, further, identifying the subscriber as a prepaid subscriber. Alternatively, according to another embodiment, the request to establish the data session received from first client device 102 may include a predetermined identifier identifying the subscriber as a prepaid subscriber.

Upon a successful authentication, at step 606, access gateway 220 determines if the subscriber is a prepaid subscriber. As mentioned in the preceding paragraph, access gateway 220 may do that based on the information received from AAA server 232. If the subscriber is not a prepaid subscriber, method 600 terminates. Otherwise, at step 608, access gateway 220 communicates with control network entity 106 to determine if the subscriber at first client device 102 has a sufficient balance to establish the data session. For instance, access gateway 220 may be preprogrammed with a network address of control network entity 106. Alternatively, the subscriber's profile may define the network address of control network entity 106, and access gateway 106 may receive that address in the authentication response from AAA server 232.

At step 610, control network entity 106 determines if a sufficient balance exists to establish the data session from the first client device 102. If the subscriber's balance is insufficient, control network entity 106 may notify access gateway 220, and, at step 612, access gateway 220 may send a data session rejection to first client device 102. Additionally, when the subscriber's balance is insufficient, access gateway 220 may redirect first client device 102 to a predetermined network entity, such as a web server, arranged to enable subscribers to refill their prepaid accounts.

If control network entity 106 determines that the subscriber's balance is sufficient, control network entity 106 may authorize access gateway 220 to establish the requested data session. When such an authorization is received at access gateway 220, at step 614, access gateway 220 establishes a control communication session between first client device 102 and control network entity 106. Further, at step 616, access gateway 220 establishes the requested data session.

At step 618, the subscriber's account is decremented during the progress of the data session. For instance, control network entity 106 may decrement the subscriber's account based on update messages being received from access gateway 220. In one embodiment, access gateway 220 may monitor the data flow, such as packet types or packet size being sent via the data session, and may provide data flow information in the update messages being sent to control network entity 106. Alternatively, control network entity 106 may provide the subscriber's balance to access gateway 220, and access gateway 220 may decrement the subscriber's balance during the progress of the data session.

At step 620, it is determined whether the subscriber's balance is still sufficient to continue the data session. If the subscriber's balance is not sufficient, at step 622, the data session is disconnected. In the embodiment, in which control network entity 106 decrements the subscriber's balance, control network entity 106 may send via the control communication session to client device 102 or to access gateway 106 a request to disconnect the data session. In the embodiment, in which access gateway 106 decrements the subscriber's balance, access gateway 106 may first communicate with control network entity 106 that the subscriber's balance is low. Control network entity 106 may then communicate with media server 218 that may play a warning message to the subscriber at first client device 102. Then, if the subscriber does not terminate the data session, access gateway 106 may disconnect the data session when the subscriber's balance reaches a low threshold level.

Referring back to step 620, if the subscriber's balance is sufficient, at step 624, access gateway 220 determines if the data session has been disconnected. If the data session continues, method 600 continues at step 618. Otherwise, at step 626, decrementing of the subscriber's balance is stopped. In the embodiment, in which control network entity 106 decrements the subscriber's balance, when access gateway 220 detects that the data session is disconnected, access gateway 220 may send via the control communication session a session disconnection notification so that control network entity 106 may stop decrementing the subscriber's balance. In the embodiment, in which access gateway 220 decrements the subscriber's balance, access gateway 220 may stop decrementing the subscriber's balance, and then may provide the updated subscriber's balance to control network entity 106, and the method 600 terminates.

It will be apparent to those of ordinary skill in the art that methods involved in the system and methods for prepaid supported communications may be embodied in a computer program product that includes one or more computer readable media. For example, a computer readable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

Further, those skilled in the art will appreciate that many of the elements described in embodiments of the present invention are functional entities that may be implemented as discrete components or in conjunction with other components, in any suitable combination and location. Still further, various functions described herein as being performed by one or more entities may be carried out by one or more processors programmed to execute an appropriate set of computer instructions stored in memory. Provided with the present disclosure, those skilled in the art can readily prepare the appropriate set of computer instructions to perform the various functions.

Exemplary embodiments of the present invention have been described above. Those skilled in the art will understand, however, that changes and modifications may be made to these embodiments without departing from the true scope and spirit of the present invention, which is defined by the claims.

What is claimed is:

1. A method for controlling data communication in a wireless network, the method comprising:
   establishing a control communication session via a data network between a first client device and a control network entity;
   establishing a data communication session via the data network between the first client device and another device; and
   using the control communication session to control the data communication session, wherein using the control communication session to control the data communication session comprises (i) transmitting via the control communication session from the control network entity to the first client device a request to disconnect the data communication session, (ii) receiving at the first client device the transmitted request to disconnect the data communication session, and (iii) the first client device disconnecting the data communication session in response to receiving the transmitted request to disconnect the data communication session.

2. The method of claim 1, further comprising, before establishing a data communication session, using the control communication session to determine if the first client device is authorized to establish the data session.

3. The method of claim 2 wherein using the control communication session to determine if the first client device is authorized to establish the data session comprises determining if a subscriber's prepaid balance is sufficient to establish the data session.

4. The method of claim 3, further comprising:
   decrementing the prepaid balance as the data session progresses;
   making a determination that the prepaid balance reaches a predetermined low threshold level; and
   generating the request to disconnect the data communication session in response to the determination that the prepaid balance reaches the predetermined low threshold level.

5. A method for providing prepaid data services in a wireless network, the method comprising:
   detecting a request to establish a first data session between a first client device and a second client device;
   determining that the first client device has a sufficient prepaid balance to establish the first data session;
   establishing a control communication session between the first client device and a control network entity;
   establishing the first data session between the first client device and the second client device; and
   using the control communication session to control the first data session, wherein using the control communication session to control the first data session comprises (i) transmitting via the control communication session from the control network entity to the first client device a request to disconnect the first data session, (ii) receiving at the first client device the transmitted request to disconnect the first data session, and (iii) the first client device disconnecting the first data session in response to receiving the transmitted request to disconnect the first data session.

6. The method of claim 5, wherein detecting a request to establish a first data session is performed at an access gateway, and determining that the first client device has a sufficient prepaid balance to establish the first data session comprises:
sending from the access gateway to the control network entity a request to determine if the sufficient subscriber balance exists to establish the first data session;
receiving the request at the control network entity;
determining at the control network entity if the sufficient balance exists to establish the first data session; and
sending a response to the access gateway from the control network entity, wherein the response comprises information that the sufficient balance exists to establish the first data session.

7. The method of claim 6, further comprising:
monitoring data flow via the first data session at the access gateway;
sending via the control communication session from the access gateway to the control network entity periodic updates including data flow information; and
decrementing the subscriber balance based on the periodic updates being received at the control network entity.

8. The method of claim 7, further comprising:
determining that the subscriber balance has reached a predetermined low threshold level; and
generating the request to disconnect the first data session in response to determining that the subscriber balance has reached the predetermined low threshold level.

9. The method of claim 8, further comprising:
using the control communication session to notify a subscriber at the first client device that the subscriber balance has reached the predetermined low threshold level; and
redirecting the first client device to a predetermined network entity so that the subscriber at the first client device can refill the subscriber balance.

10. The method of claim 5, wherein detecting a request to establish a first data session is performed at an access gateway, and determining that the first client device has a sufficient prepaid balance to establish the first data session comprises:
sending from the access gateway to the control network entity a request to determine if the sufficient subscriber balance exists to establish the first data session;
receiving the request at the control network entity;
providing a subscriber balance from the control network entity to the access gateway; and
determining at the access gateway if the subscriber balance is sufficient to establish the first data session.

11. The method of claim 10, further comprising:
monitoring data flow via the first data session at the access gateway;
decrementing the subscriber balance based on the data flow via the first data session;
determining that the subscriber balance has reached a predetermined low threshold level;
notifying the control network entity that the subscriber balance has reached the predetermined low threshold level;
using the control communication session to notify the subscriber that the subscriber balance has reached the predetermined low threshold level; and
generating the request to disconnect the first data session in response to determining that the subscriber balance has reached the predetermined low threshold level.

12. The method of claim 11, further comprising redirecting the first client device to a predetermined network entity so that the subscriber at the first client device can refill the subscriber balance.

13. A method for controlling prepaid data communication in a wireless network, the method comprising:
receiving at an access gateway a request to establish a data communication session between a first client device and a second client device;
determining that a subscriber at the first client device is a prepaid subscriber;
determining if a prepaid balance is sufficient to establish the data communication session;
establishing the requested data communication session if the prepaid balance is sufficient;
establishing a control communication session from the first client device to a control network entity;
using the control communication session to send between the access gateway and the control network entity periodic updates comprising data flow information;
decrementing the prepaid balance at the control network entity based on the data flow information; and
using the control communication session to control the data communication session, wherein using the control communication session to control the data communication session comprises (i) transmitting via the control communication session from the control network entity to the first client device a request to disconnect the data communication session, (ii) receiving at the first client device the transmitted request to disconnect the data communication session, and (iii) the first client device disconnecting the data communication session in response to receiving the transmitted request to disconnect the data communication session.

14. The method of claim 13, further comprising:
determining that the prepaid balance has reached a low threshold level;
using the control communication session to notify the subscriber at the first client device that the prepaid balance has reached the low threshold level; and
generating the request to disconnect the data communication session in response to determining that the prepaid balance has reached the low threshold level.

15. A system for controlling data session in a communications network, the system comprising:
a client device arranged to establish data communication sessions;
a control network entity arranged to control data communication sessions;
an access gateway arranged to detect a request to establish a data communication session between the client device and another device, the access gateway, responsively, arranged to determine if a subscriber at the client device is a prepaid subscriber, and, if the subscriber is the prepaid subscriber, the access gateway is arranged to communicate with the control network entity to determine if a prepaid balance is sufficient to establish the data communication session, and, if the prepaid balance is sufficient, the access gateway is arranged to establish a control communication session between the client device and the control network entity, and further to establish the data communication session between the client device and the another device, wherein the control communication session is operable to carry from the control network entity to the client device a request to disconnect the data communication session.

16. The system of claim 15, wherein the access gateway is further arranged to monitor data flow via the data communication session and send to the control network entity periodic update messages including data flow information, and wherein the control network entity is further arranged to decrement the subscriber balance based on the update messages being received from the access gateway.

17. The system of claim 16, wherein the control network entity is further arranged to determine when the subscriber balance reaches a predetermined low threshold level, and responsively, the control network entity is arranged to use the control communication session to notify the subscriber at the client device that the subscriber balance has reached the predetermined low threshold level, the control network entity is further arranged to use the control communication session to send to the client device a request to disconnect the data communication session.

18. The system of claim 17, wherein the control network entity is further arranged to redirect the client device to a predetermined network entity arranged to enable the subscriber to refill the subscriber balance.

* * * * *